United States Patent [19]
Mawet

[11] Patent Number: 5,869,999
[45] Date of Patent: Feb. 9, 1999

[54] OPEN LOOP PRE-AMPLIFIER FOR AN ELECTRONIC MEASURING SYSTEM

[75] Inventor: Patrick H. Mawet, Snohomish, Wash.

[73] Assignee: Mitutoyo Corporation, Kawasaki, Japan

[21] Appl. No.: 634,097

[22] Filed: Apr. 17, 1996

[51] Int. Cl.[6] ............................... H03F 3/45; G01R 27/26
[52] U.S. Cl. ............................... 330/253; 330/9; 330/51; 330/257; 330/258; 324/676; 324/679
[58] Field of Search .................................. 330/9, 51, 253, 330/257, 258, 310, 311; 324/658, 676, 677, 679

[56] References Cited

U.S. PATENT DOCUMENTS

| | | | |
|---|---|---|---|
| 4,459,555 | 7/1984 | Jett, Jr. ................................. | 330/257 V |
| 4,574,250 | 3/1986 | Senderowicz ........................... | 330/258 |
| 4,879,508 | 11/1989 | Andermo .............................. | 324/61 R |

*Primary Examiner*—James B. Mullins
*Attorney, Agent, or Firm*—Oliff & Berridge, PLC

[57] ABSTRACT

A fast, open-loop amplifier for an electronic measuring system is formed by a folded, differential, open-loop amplifier. This amplifier includes a differential common-source portion, a current mirror portion and a load portion. The current mirror portion is connected between the differential common-source portion and the load portion. The load portion is connected to a common voltage supply portion. The fast, open-loop amplifier can include multiple stages, where each stage includes the folded, differential, open-loop amplifier. In this case, each stage can have its own common voltage supply portion. Alternatively, a single common voltage supply portion can be shared between the stages. All the transistors of the differential common source portion and the load portion have the same type of doping, while all the transistors of the current mirror are the same type of doping, but of a type which is different than that used in the differential common source amplifier portion and the load portion.

28 Claims, 10 Drawing Sheets

AMPLIFIER 40'

AMPLIFIER 40"

OPEN LOOP PRE-AMPLIFIER FOR AN ELECTRONIC MEASURING SYSTEM

BACKGROUND OF THE INVENTION

1. Field of the Invention

This invention relates to the structure and operation of a pre-amplifier for amplifying signals received from a transducer of an electronic measuring system. More particularly, this invention relates to the structure and operation of a fast response, open loop pre-amplifier.

2. Description of Related Art

Electronic measuring systems, such as capacitive or inductive calipers, linear scales and the like, such as those shown in U.S. Pat. Nos. 4,420,754, 4,878,013, 4,879,508 and 5,023,559, and in U.S. patent application Ser. No. 08/441,769 filed May 16, 1995 (now U.S. patent application Ser. No. 08/912,567, filed Aug. 18, 1997), herein incorporated by reference, are well known in the art. As shown in FIG. 1, the prior art measuring system 20 includes a microprocessor controller 22 which controls a ROM 28, an amplifier 40, a demodulator 50, an integrator 52 and an analog-to-digital (A/D) converter 54. An oscillator 26 is connected to the microprocessor controller 22 and a modulator 30. The ROM 28 outputs, for example, 8 bits of data to the modulator 30 based on the control signals received from the microprocessor controller 22.

The modulator 30 modulates the oscillator signal received from the oscillator 26 based on the data received from the ROM 28 and outputs the modulated oscillator signals to the measurement transducer 32.

The measurement transducer 32 can be any known type of electronic transducer, such as a relative position capacitive position encoder, an absolute position capacitive position encoder, a relative position inductive position encoder, an absolute position inductive position encoder, or the like. The modulated signals are input by the transducer 32. The transducer 32 further modulates those signals based on the relative or absolute position between a slide of the transducer and a scale of the transducer. The transducer thus outputs a signal which is indicative of the relative or absolute position of the slide on the scale. This signal is output to the amplifier 40.

The amplifier 40, based on control signals received from the microprocessor controller 22, amplifies the signal received from the transducer 32. The amplified signal is then output to the demodulator 50. The demodulator 50 may include a sample and hold circuit for sampling and holding the amplified signal from the amplifier 40 based on control signals received from the microprocessor controller 22. The demodulator 50 then demodulates the sampled signal based on control signals from the microprocessor controller 22. The demodulator 50 then outputs the demodulated signals to the integrator 52.

The integrator 52 integrates a number of signals received from the demodulator 50 based on control signals received from the microprocessor controller 22. The integrator 52 then outputs the integrated signal to the A/D converter 54. The A/D converter 54 then converts the analog integrated signal received from the integrator 52 to a digital signal based on control signals received from the microprocessor controller 22. The A/D converter 54 then outputs the digital signal to the microprocessor controller 22.

The microprocessor controller 22 then processes the digital signal received from the A/D converter 54 to determine the relative or absolute position of the slider of the transducer 32 to the scale of the transducer 32. The determined relative or absolute position is output to a display 24 to be viewed by an operator. Alternatively, the position signal output by the microprocessor controller 22 can be output to another controller, such as the controller of a numerically controlled machine tool, a computer or the like.

FIG. 2 shows a well known amplifier circuit for the amplifier 40. As shown in FIG. 2, the transducer signal input from the transducer 32 is connected to one plate of a capacitor 42. The other plate of the capacitor 42 is connected to the base of a PMOS transistor 44, the base of a NMOS transducer 46 and one pole of a switch 48. The transistors 44 and 46 are connected in series between a supply voltage $V_{DD}$ and ground. The output of the amplifier 40, which is connected to the input of the demodulator 50, is connected between the PMOS transistor 44 and the NMOS transistor 46. Furthermore, the other pole of the switch 48 is connected directly to the output of the amplifier 40. Thus, when the switch 48 is closed, the input to the amplifier 40 is connected directly to the output of the amplifier 40, resetting the amplifier 40, as described below.

In operation, when the transducer 32 outputs a voltage signal to the amplifier 40, the NMOS transistor 46 and the PMOS transistor 44 act in concert to amplify the input voltage signal input to the amplifier 40 to obtain the amplified output voltage signal from the amplifier 40. The gain in amplitude of the amplified output voltage signal output by the amplifier 40 is based on the transconductance $g_{44}$ and the output conductance $c_{44}$ of the PMOS transistor 44 and the transconductance $g_{46}$ and the output conductance $c_{46}$ of the NMOS transistor 46. In particular, the gain G provided by the amplifier 40 is $$G = -(g_{44}+g_{46})/(c_{44}+c_{46}).$$

The transconductances $g_{44}$ and $g_{46}$ are a function of the PMOS transconductance parameter $K'_P$ and the NMOS transconductance parameter $K'_N$, respectively. The output conductances $c_{44}$ and $c_{46}$ are a function of the PMOS channel length modulation parameter $\lambda_P$ and the NMOS channel length modulation parameter $\lambda_N$, respectively. Each of these parameters is process dependent, and will vary independently of the each other.

When the switch is closed, the output to the demodulator 50 stabilizes at the midpoint of the curve shown in FIG. 3. When the switch 48 is open, the amplifier 40 provides a very fast, high-gain amplification of the input signal received from the transducer 32.

However, due to the differing manufacturing processes required to form the PMOS transistor 44 and the NMOS transistor 46, the transconductance parameters $K'_P$ and $K'_N$ and the channel length modulation parameters $\lambda_P$ and $\lambda_N$ will vary uncontrollably. Thus, it is extremely difficult to match the transconductance $g_{44}$ and the output conductance $c_{44}$ of the PMOS transducer 44 and the transconductance $g_{46}$ and the output conductance $c_{46}$ of the NMOS transistor 46. Thus, the amount of amplification provided by the amplifier 40 will be difficult to predict by design. However, it is necessary for the amplifier to have a controlled, linear and predictable gain. Because the manufacturing processes which are used to form the PMOS transistor 44 and the NMOS transistor 46 are difficult to control, and the processes are different for each of the transistors 44 and 46, a predictable gain is thus impossible to obtain.

The transconductance g of a PMOS or NMOS transistor is a function of the transconductance parameter K', while the output conductance c of a PMOS or NMOS transistor is a function of the channel length modulation parameter λ. However, the transconductance parameter K' and the channel length modulation parameter λ of such MOS transistors can each vary by ±30% due to uncontrollable manufacturing process variations. Thus, a predictable transconductance g and a predictable output conductance c for such MOS transistors is difficult to obtain.

FIG. 4 shows another possible amplifier 40'. As shown in FIG. 4, the amplifier 40' is generally similar to the amplifier 40 shown in FIG. 3. However, in the amplifier 40' shown in FIG. 4, the gate of the PMOS transistor 44 is connected to the node between the transistors 44 and 46, rather than to the capacitor 42. In the amplifier 40' shown in FIG. 4, the gain G of the amplifier 40' is:

$$G=(-g_{44}/g_{46})^{1/2}$$

where $g_{44}$ is the transconductance of the PMOS transducer 44, and $g_{46}$ is the transconductance of the NMOS transistor 46. In general, the gain G of the amplifier 40' will also be highly dependent upon the process-dependent transconductance parameters $K'_P$ and $K'_N$ of the transistors 44 and 46, but not upon the channel length modulation parameters $\lambda_N$ and $\lambda_P$. Therefore, the gain will be more predictable by design than in the previous amplifier 40. In order to achieve some amplification, the transconductance $g_{46}$ of the NMOS transistor 46 will be very much larger than the transconductance $g_{44}$ of the PMOS transistor 44.

Furthermore, in the amplifiers 40 and 40', the output will generally not be perfectly linear, as seen on the curve shown in FIG. 3. To compensate for this non-linearity, two amplifiers $40_1'$ and $40_2'$ can be combined and connected to the inverting and non-inverting inputs of an operational amplifier, as shown in the amplifier 40" of FIG. 5. In the amplifier 40", the transducer 32 must output two outputs, a positive signal IN+ and a negative signal IN−. Each of the positive and negative signals IN+ and IN− from the transducer 32 are input to one of a pair of capacitors 47. The positive and negative signals IN+ and IN− are then connected to the amplifiers $40_1'$ and $40_2'$, respectively, of the amplifier 40". The output of the first and second amplifiers $40_1'$ and $40_2'$ of the amplifier 40", shown at points A and B, respectively, are equal to:

$$V_A=k(V_{IN+}/2+V_{CM})$$
$$V_B=k(V_{IN-}/2+V_{CM})$$

where $V_{IN+}$ is the positive voltage output by the transducer 32, $V_{IN-}$ is the negative voltage output by the transducer 32, and $V_{CM}$ is the common mode voltage.

The amplifier 40" shown in FIG. 5 allows the non-linearities of the amplifiers $40_1'$ and $40_2'$ to self-compensate. However, the amplifier 40" introduces the common mode voltage $V_{CM}$. The common mode voltage $V_{CM}$ arises because the positive voltage signal IN+ and the negative voltage signal IN− output by the transducer 32 cannot be fully isolated from each other. This arises due to the geometry of the transducer 32, noise in the electronic measuring system 20, noise picked up from the environment by the transducer 32, and cross-talk between the positive voltage signal IN+ and the negative voltage signal IN− within the transducer 32.

The common mode voltage $V_{CM}$ is undesirable because margin is lost due to saturation of the transistors. That is, as shown in FIG. 6, when the common mode voltage $V_{CM}$ is not present, the original margin $M_O$ between the saturation voltage $V_S$ and the input voltage $V_{IN}/2$ is significantly larger than the margin $M_{CM}$ available when the common mode voltage is present.

Furthermore, as shown in FIG. 6, when the common mode voltage $V_{CM}$ is present, the signals received from the transducer 32 are no longer in the linear operating range O of the amplifier 40". Thus, the common mode voltage $V_{CM}$ causes the amplifier 40" to lose linearity. Finally, the common mode voltage $V_{CM}$ can generate other circuit imbalances affecting the linearity and predictability of the gain from the amplifier 40".

SUMMARY OF THE INVENTION

Accordingly, this invention provides an amplifier for an electronic measuring system which is a very fast, high gain amplifier and which has a controlled, linear and predictable gain.

This invention further provides an amplifier for an electronic measuring system having a plurality of stages, where each stage provides a controlled, linear and predictable gain.

The amplifier of this invention includes a common source differential amplifier using the same type of transistor (P-type or N-type). Thus, the uncontrollable manufacturing process variations affecting the transconductance parameters of each of the transistors will be the same for both transistors, thus ensuring that the transconductances g of the transistors of the common source differential amplifier will be closely matched.

The amplifier of this invention also includes a current mirror and a load circuit. The common mode differential amplifier is connected to the current mirror. The current mirror is formed by transistors of the other type from the transistors forming the common source differential amplifier. The current mirror is then connected to the load circuit, which uses the same type of transistors as the common source differential amplifier.

Thus, the common source differential amplifier, the current mirror and the load circuit together form a folded, differential, open-loop amplifier.

The amplifier of this invention can be used in each of a plurality of serially connected stages. This provides greater amplification than can be obtained with a single stage.

These and other features and advantages of this invention as described in, or are apparent from, the following detailed description of the preferred embodiments.

BRIEF DESCRIPTION OF THE DRAWINGS

The preferred embodiments of this invention will be described in detail, with reference to the following figures wherein.

DETAILED DESCRIPTION OF THE PREFERRED EMBODIMENTS

Figure 7:
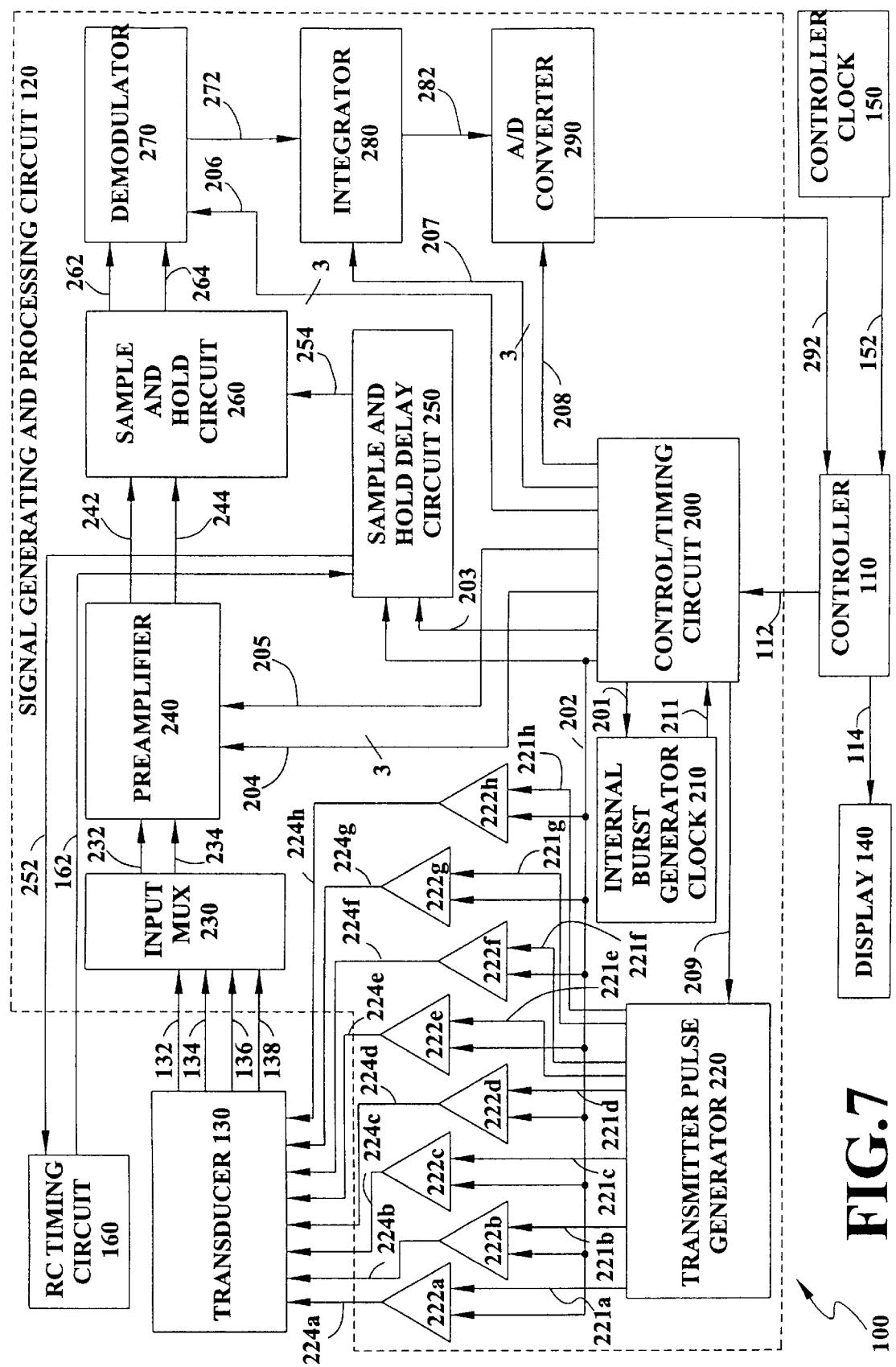
FIG. 7 shows a first preferred embodiment of the electronic measurement system of this invention.

FIG. 7 shows a first preferred embodiment of an electronic measurement system 100 incorporating the amplifier of this invention. As shown in FIG. 7, the electronic measurement system 100 comprises a controller 110, a signal generating and processing circuit 120, a transducer 130, a display 140, a controller clock 150, and an RC timing circuit 160. U.S. provisional patent application 60/015,707, filed Apr. 17, 1996, abandoned (now U.S. non-provisional patent application 08/834,434, filed Apr. 16, 1997), discloses the controller clock in greater detail and is incorporated herein by reference.

In particular, the controller clock 150 outputs clock signals on a signal line 152 to the controller 110. The controller 110 outputs control signals on the signal line 112 to the signal generating and processing circuit 120. The signal generating and processing circuit 120 generates, based on the control signals supplied by the controller 110, a plurality of drive signals to the transducer 130. The transducer 130 then outputs a plurality of position indicating signals back to the signal generating and processing circuit 120.

The signal generating and processing circuit 120 samples the signals output from the transducer 130 based on the RC timing circuit 160. The signal generating and processing circuit 120, based on the sampled position indicating signals output from the transducer 130, generates a digital position indicating signal. The digital position indicating signal is output from the signal generating and processing circuit 120 on a signal line 292 to the controller 110.

The controller 110 then further processes the signal and outputs a position signal on the signal line 114 to the display 140. The display 140 then displays the position indicated by the position signal to an operator.

The controller 110 shown in FIG. 7 is preferably implemented using a programmed microprocessor or microcontroller, and possibly one or more peripheral integrated circuit elements. The controller 110 can also be implemented on a programmed general purpose computer, a special purpose computer, and ASIC or other integrated circuit, hardwired electronic circuits such as a discrete element circuit, a programmable logic device such as a PLD, PLA or PAL, or the like. In general, any device which is capable of generating the control signals described herein can be used to implement the controller 110.

The display 140 can be any standard CRT, LCD or LED visual display. In addition, the display 140 can be replaced by a connection to a further control system, such as the controller of a numerically controlled machine tool or the like, or a general purpose computer. In general, any device which could input the position signal output on the output line 114 and further process it could be used in place of the display 140.

As shown in FIG. 7, the signal generating and processing circuit 120 includes a control/timing circuit 200 which inputs the control signals output by the controller 110 on the signal line 112. The control/timing circuit 200 processes the control signals received from the controller 110 and outputs control signals to the various elements of the signal generating and processing circuit 120. In particular, an internal burst generator clock 210 receives a control signal from the control/timing circuit 200 over a signal line 201. When the internal burst generator clock 210 is activated, a high frequency (preferably 2 MHz) clock signal is generated by the internal burst generator clock 210 and output to the control/timing circuit 200 over a signal line 211.

The control/timing circuit 200 also outputs pulse data on a signal line 209 to a transmitter pulse generator 220. The transmitter pulse generator 220 outputs driver signals on the signals lines 221a–221h based on the pulse data input over the signal line 209. Each of the signal lines 221a–221h are connected to one of a plurality of transmitter drivers 222a–222h.

Also connected to each of the transmitter drivers 222a–222h is a signal line 202 from the control/timing circuit 200. The signal line 202 is also connected to a sample and hold delay circuit 250 of the signal generating and processing circuit 120. The synchronization signal output on the signal line controls the transmitter drivers 221a–221h to provide proper modulation signals on the signal lines 224a–224h connected to the transducer 130.

Figure 1:
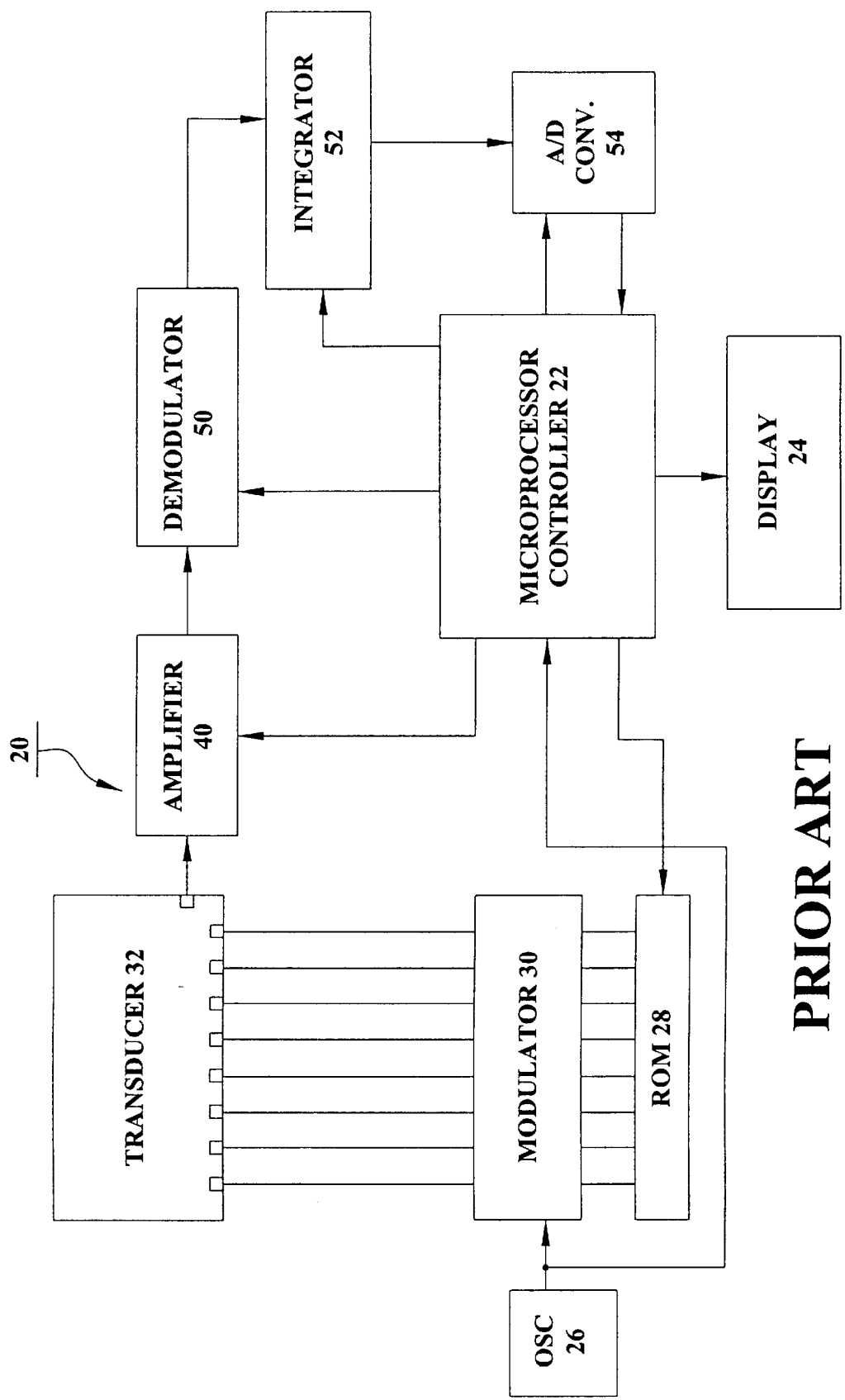
FIG. 1 shows a conventional electronic measurement system.
Figure 2:
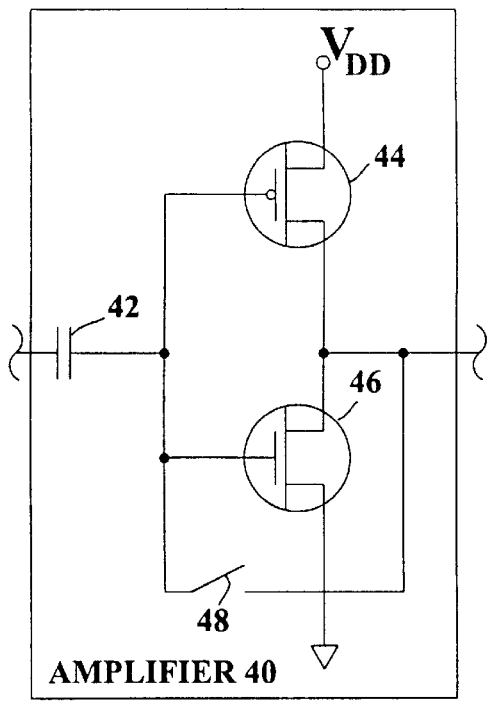
FIG. 2 shows a first embodiment of a conventional amplifier used in the electronic measurement system of FIG. 1.
Figure 3:
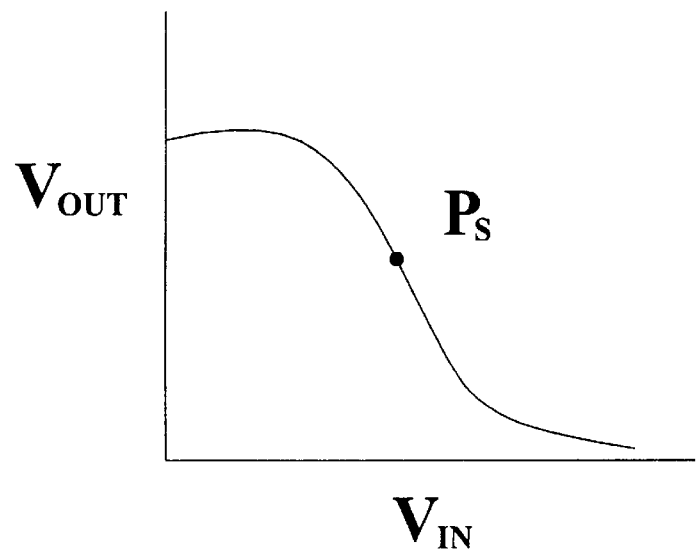
FIG. 3 shows the input-output curve for the first embodiment of the amplifier shown in FIG. 2.
Figure 4:
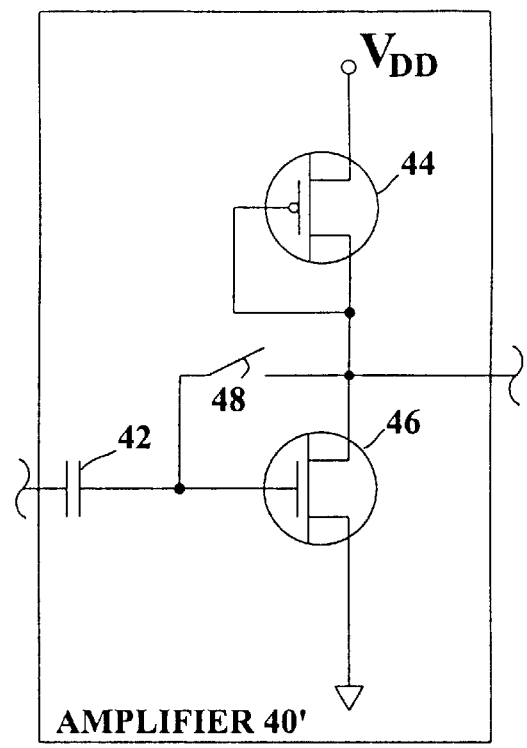
FIG. 4 shows a second embodiment of a conventional amplifier used in the electronic measurement system of FIG. 1.
Figure 5:
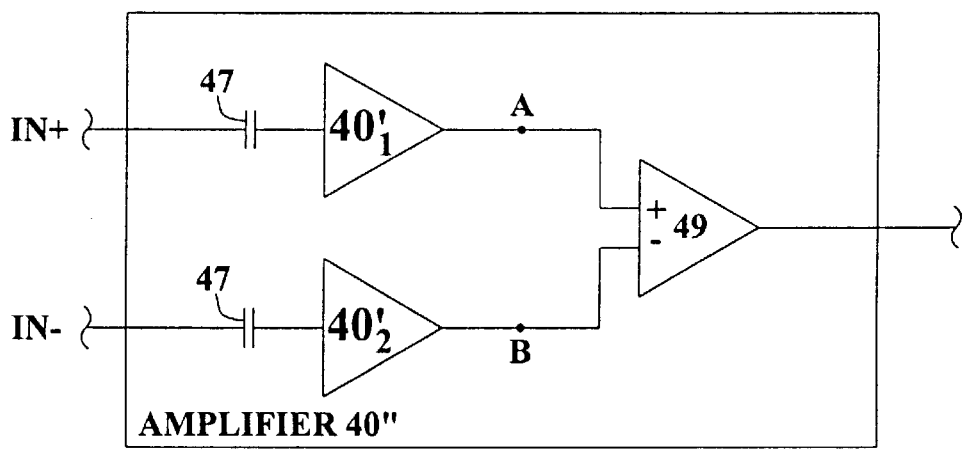
FIG. 5 shows a third embodiment of a conventional amplifier used in the electronic measurement system of FIG. 1.
Figure 6:
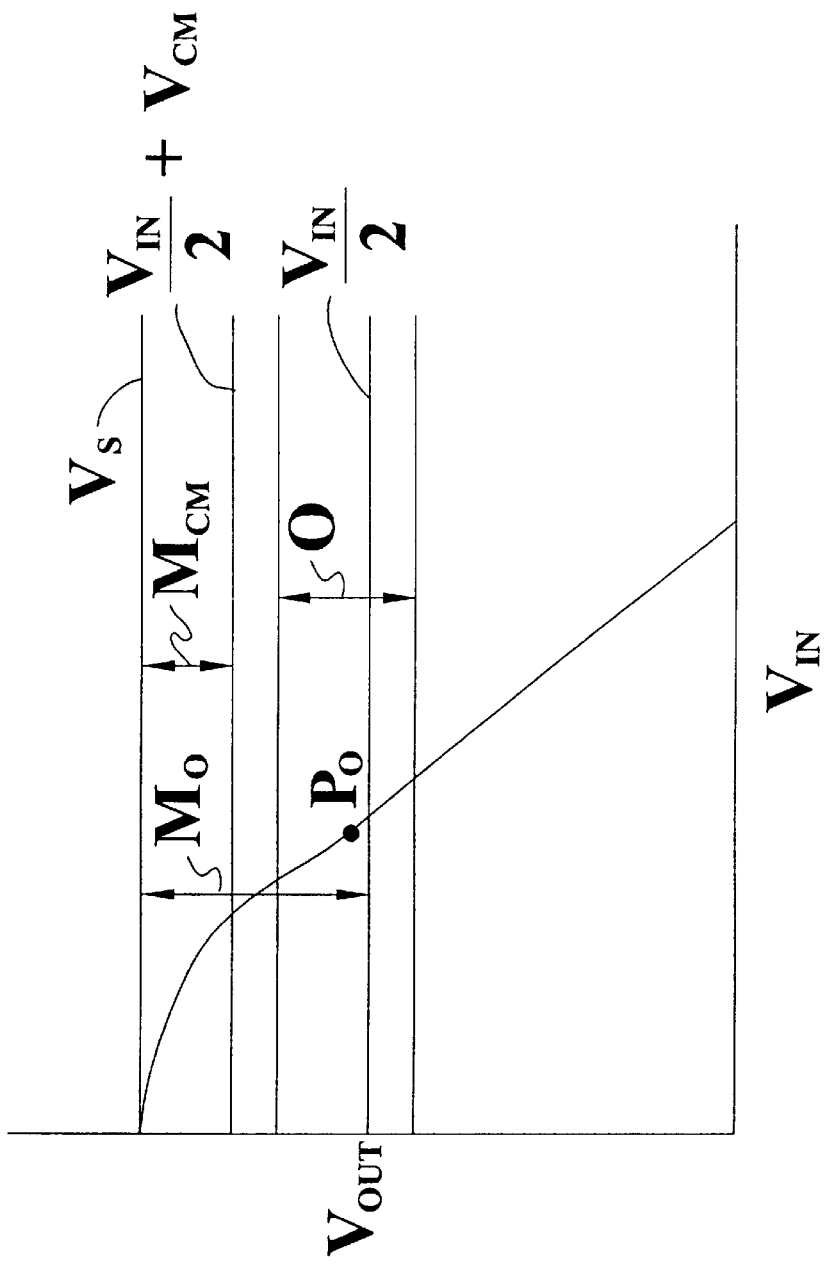
FIG. 6 shows the input-output curve for the amplifier shown in FIG. 5.

As described above, in reference to FIG. 1, the transducer 130 can be an absolute or relative position capacitive position encoder, a absolute or relative position inductive position encoder, or the like. Furthermore, while eight modulation signals are input to the transducer 130 over the signal lines 224a–224h, any number of signals can be generated and input to the transducer 130 by the signal generating and processing circuit 120. Similarly, there may be fewer or more transmitter drivers 222 than those shown in FIG. 7. For example, the transducer 130 may require 16 different modulation signals, rather than eight.

In general, the transducer 130 will have a slide member which is movable relative to a scale member along a measurement axis. The signal line(s) 224 are connected to one or more capacitive or inductive circuit members on one of the slide member or the scale member. A capacitive or inductive transfer function between the slide member and the scale member of the transducer 130 modifies the signals input of the signal lines 224a–224h based on the relative or absolute position of the slide member relative to the scale member. A number of signal output lines 132–138 are connected to additional capacitive or inductive members of the slide member or the scale member of the transducer 130. Generally, all the input signal lines 224a–224h and the output signal lines 132–138 will be connected to the same member of the transducer 130.

The output signal lines 132–138 are connected to an input multiplexer 230 of the signal generating and processing circuit 120. The input multiplexer selectively connects two of the input signal lines 132–138 to the output signal lines 232 and 234 connected to the pre-amplifier 240. The pre-amplifier 240, based on control signals output from the control/timing circuit 200 on the signal lines 204 and 205, amplifies the signals output from the input multiplexer 230 on the signal lines 232 and 234. The pre-amplifier 240 then outputs these amplified signals on the signal lines 242 and 244 to a sample and hold circuit 260.

The sample and hold circuit 260 samples the amplified output signals output on the signal lines 242 and 244 based on a control signal output on the signal line 254 from the sample and hold delay circuit 250. Based on the control signals output from the control/timing circuit 200 to the sample and hold delay circuit 250, the sample and hold delay circuit 250 outputs a control signal to the RC timing circuit 160 on the signal line 252.

The RC timing circuit 160 outputs a delayed control signal corresponding to the control signal output on the signal line 252 back to the sample and hold delay circuit 250 on the signal line 162. The sample and hold delay circuit 250 outputs the control signal on the signal line 254 based on the synchronization signal output on the signal line 202 from the control/timing circuit 200 and the delayed control signal output on the signal line 162 from the RC timing circuit. The sample and hold delay circuit 250 further generates the control signal on the signal line 254 based on a second control signal output from the control/timing circuit 200 on the signal line 203.

Once the sample and hold circuit 260 has sampled the amplified output circuits input on the signal lines 242 and 244, the held signals are output on signal lines 262 and 264 to a demodulator 270. The control/timing circuit 200 also outputs a plurality of control signals on the signal lines 206 to the demodulator 270. The demodulator 270 demodulates the signals received from the sample and hold circuit 260 and outputs a demodulated signal on the signal line 272 to the integrator 280.

The integrator 280, based on a plurality of control signals output on the control lines 207 from the control/timing circuit 200, integrates a number of the demodulated signals output from the demodulator 270 on the signal line 272. The integrator then outputs the integrated signal on the signal line 282 to the A/D converter 290. Based on a control signal output from the control/timing circuit 200 on the signal line 208, the A/D converter 290 converts the integrated signal received from the integrator 280 on the signal line 282 to a digital signal. This digital signal in then output on the signal line 292 to the controller 110.

Figure 8:
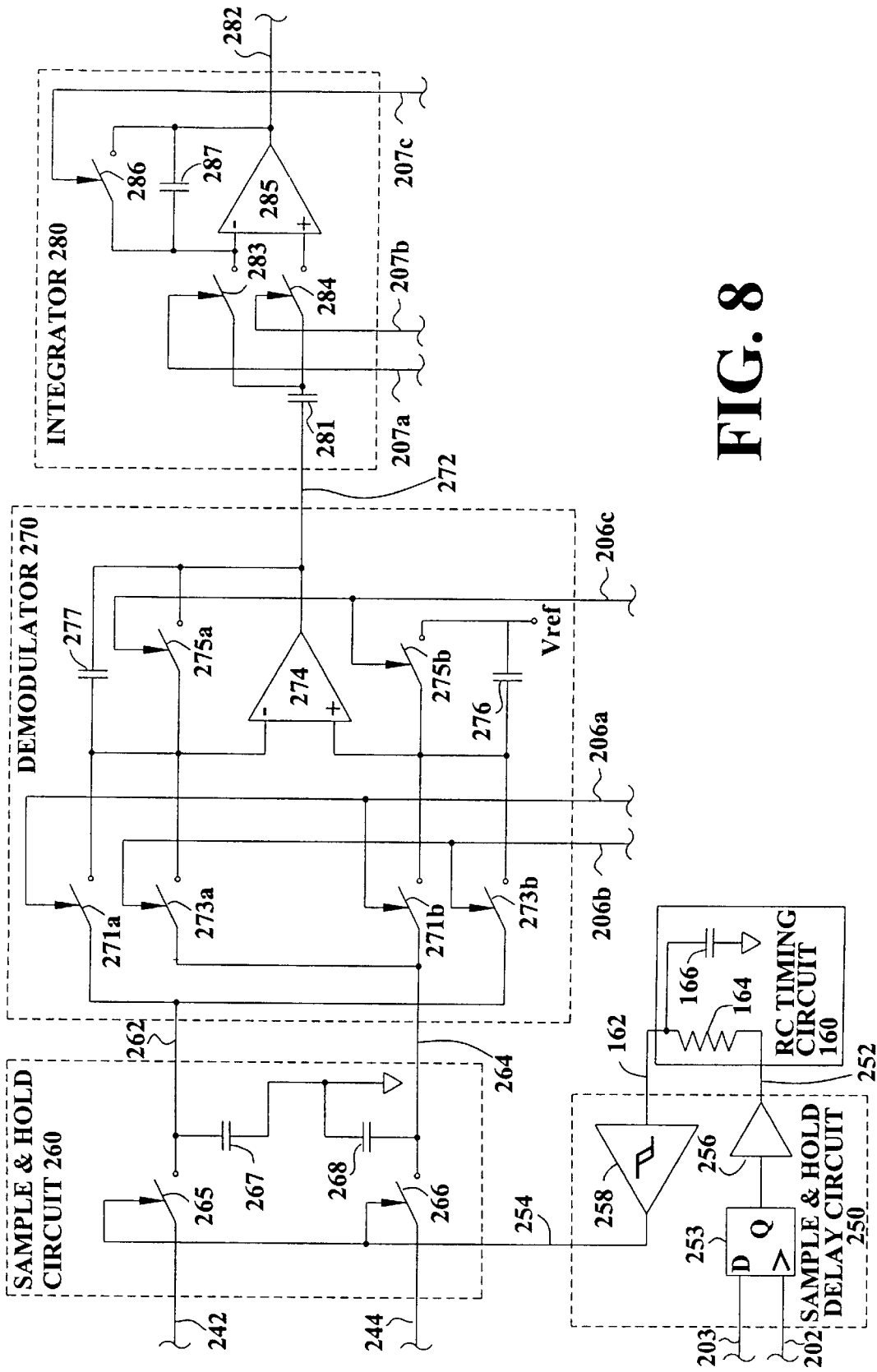
FIG. 8 shows the sample and hold delay circuit, RC timing circuit, the sample and hold circuit, the demodulator, and the integrator of the first preferred embodiment of the electronic measurement system of this invention in greater detail.

FIG. 8 shows in greater detail the sample and hold delay circuit 250, the RC timing circuit 160, the sample and hold circuit 260, the demodulator 270 and the integrator 280. In particular, the sample and hold delay circuit 250 comprises a D-type flip-flop 253, a driver 256, and a Schmitt trigger 258. The D input of the D-type flip-flop 253 is connected to the control signal line 203 from the control/timing circuit 200. The clock input for the D-type flip-flop 253 is connected to the signal line 202, which inputs the synchronization signal from the control/timing circuit 200. The driver 256 is connected between the Q output of the D-type flip-flop 253 and the signal line 252. The input of the Schmitt trigger 258 is connected to the input signal line 162, while the output of the Schmitt trigger 258 is connected to the signal line 254.

The RC timing circuit 160 comprises a resistor 164 and a capacitor 166. The resistor 164 is connected between the input signal line 252 from the driver 256 and the output signal line 162 connected to the Schmitt trigger 258. The capacitor 166 is connected between the output signal line 162 and ground. Thus, when an output signal is output from the driver 256 on the signal line 252 to the RC timing circuit 160, the signal on the output signal line 162 from the RC timing circuit will rise as a decaying exponential based on the resistance of the resistor 164 and the capacitance of the capacitor 166.

The output from the Schmitt trigger 258 on the signal line 254 is used as a control signal. In particular, the signal line 254 is connected to switches 265 and 266 of the sample and hold circuit 260. One pole of the switch 265 of the sample and hold circuit 260 is connected to the input line 242. The other pole of the switch 265 is connected to the output line 262. Similarly, one pole of the switch 266 is connected to the input signal line 244, while the other pole of the switch 266 is connected to the output signal line 264. A first capacitor 267 is connected between the output signal line 262 and ground, while a second capacitor 268 is connected between the signal line 264 and ground.

When the switches 265 and 266 of the sample and hold circuit 260 are closed, the input signals received on the input signal lines 242 and 244 are passed through the switches 265 and 266 to the output lines 262 and 264. Simultaneously, the capacitors 267 and 268 are charged. Then, when the switches 265 and 266 are open, the voltage amplitudes on the signal lines 262 and 264 are held to the voltages stored on the capacitors 267 and 268, respectively.

The demodulator 270 comprises two sets of switches 271a and 271b, and 273a and 273b, respectively. The input signal line 262 is connected to one pole of each of the switches 271a and 273b. The input signal line 264 is similarly connected to one pole of each of the switches 273a and 271b. A first control signal line 206a from the control/timing circuit 200 is used to control the switches 271a and 271b. A second control signal line 206b from the control/timing circuit 200 is used to control the switches 273a and 273b.

The other poles of each of the switches 271a and 273a are connected to the inverting input of an operational amplifier 274. Similarly, each of the other poles of the switches 271b and 273b are connected to the non-inverting input of the operational amplifier 274. The inverting input to the operational amplifier 274 is connected to the output signal line 272 of the operational amplifier 274 by a capacitor 277 and a switch 275a connected in parallel. Similarly, the non-inverting input of the operational amplifier 274 is connected to a reference voltage $V_{ref}$ by a capacitor 276 and a switch 275b connected in parallel. A third control signal line 206c from the control/timing circuit 200 is used to control the switches 275a and 275b.

The demodulated signal output from the operational amplifier 274 of the demodulator 270 on the signal line 272 is input to a capacitor 281 of the integrator 280. The capacitor 281 is connected to the inverting and non-inverting inputs of an operational amplifier 285 through a first switch 283 and a second switch 284, respectively. The first switch 283 is controlled by a control signal output from the control/timing circuit 200 on a first signal line 207a. The second switch 284 is similarly controlled by a second control signal output from the control/timing circuit 200 on a second control signal line 207b.

The output signal line 282 of the integrator 280 is connected to the output of the operational amplifier 285. The output of the operational amplifier 285 is fed back to the inverting input of the operational amplifier 285 through a capacitor 287 and a switch 286 connected in parallel. A control signal for the switch 286 is input from the control/timing circuit 200 over a third control signal line 207c.

Figure 9:
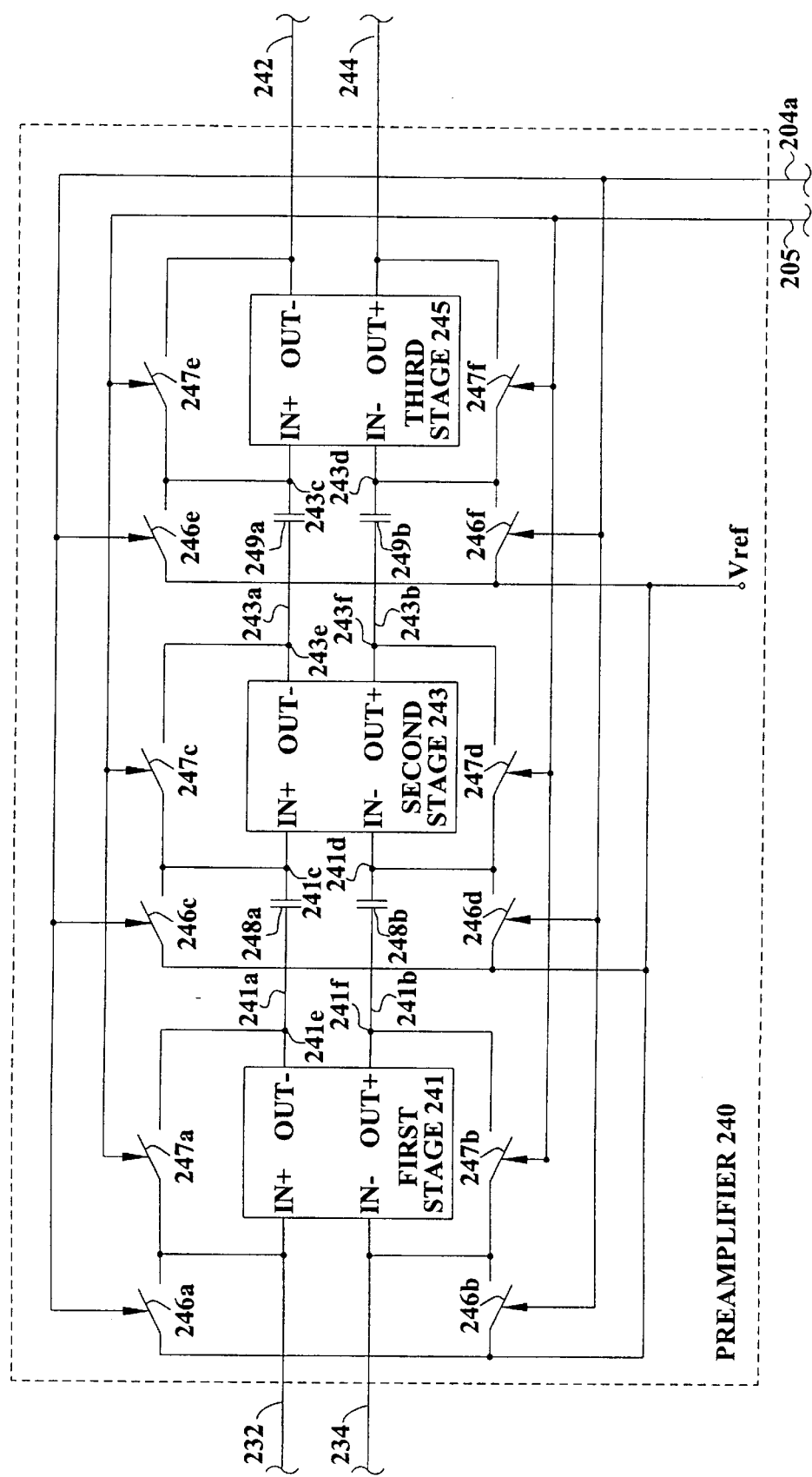
FIG. 9 shows the pre-amplifier of the electronic measurement system of this invention in greater detail.

FIG. 9 shows a first preferred embodiment of the pre-amplifier 240. As shown in FIG. 9, the pre-amplifier 240 comprises three amplifier stages, a first stage 241, a second stage 243 and a third stage 245. The input signal lines 232 and 234 to the pre-amplifier 240 are connected to the IN+ and IN– inputs of the first stage 241, respectively. The output signal lines 242 and 244 of the pre-amplifier 240 are connected to the OUT– and OUT+ terminals of the third stage 245, respectively. Similarly, the OUT– and OUT+ terminals of the first stage 241 are connected by the signal lines 241a and 241b through a pair of first capacitors 248a and 248b to the IN+ and IN– terminals of the second stage 243, respectively. Furthermore, the OUT– and OUT+ terminals of the second stage 243 are connected to the IN+ and IN– terminals of the third stage 245 by the signal lines 243a and 243b through a pair of second capacitors 249a and 249b, respectively.

The first poles of a plurality of switches 246a–246f are connected to the voltage reference $V_{ref}$. The second poles of the switches 246a, 246c and 246e are connected to the signal lines 232, 241a and 243a, respectively, at the nodes 232a, 241c and 243c, respectively. The second poles of the switches 246b, 246d and 246f are connected to the signal lines 234, 241b and 243b, respectively, at the nodes 234a, 241d and 243d, respectively. The switches 246a–246f are controlled by a control signal output from the control/timing circuit 200 over the signal line 204a.

First poles of the switches 247a, 247c, 247e, are connected to the signal lines 232, 241a and 243a, respectively, at the nodes 232a, 241c and 243c, respectively. The other poles of the switches 247a, 247c and 247e are connected to the signal lines 241a, 243a and 242, respectively, at the nodes 241e, 243c and 242a, respectively. Similarly, the first poles of the switches 247b, 247d and 247f are connected to the signal lines 234, 241b and 243b, respectively, at the nodes 234a, 241d and 243d, respectively. The second poles of the switches 247b, 247d and 247f are connected to the signal lines 241b, 243b and 244, respectively, at the nodes 241f, 243f and 244a, respectively.

Each of the switches 247a–247f are controlled by a control signal output from the control/timing circuit 200 on the signal line 205. Thus, the first capacitor 248a is positioned in the signal line 241a between the nodes 241e and 241c. Similarly, the first capacitor 248b is positioned in the signal line 241b between the nodes 241f and 241d. Likewise, the second capacitor 249a is positioned in the signal line 243a between the nodes 243e and 243c. Similarly, the second capacitor 249b is positioned in the signal line 243b between the nodes 243f and 243d. The pair of first capacitors 248a and 248b and the pair of second capacitors 249a and 249b decouple the stages, by storing the reset bias voltage supplied to the first-third stages 241–245 when the switches 247–247f are closed.

Figure 10:
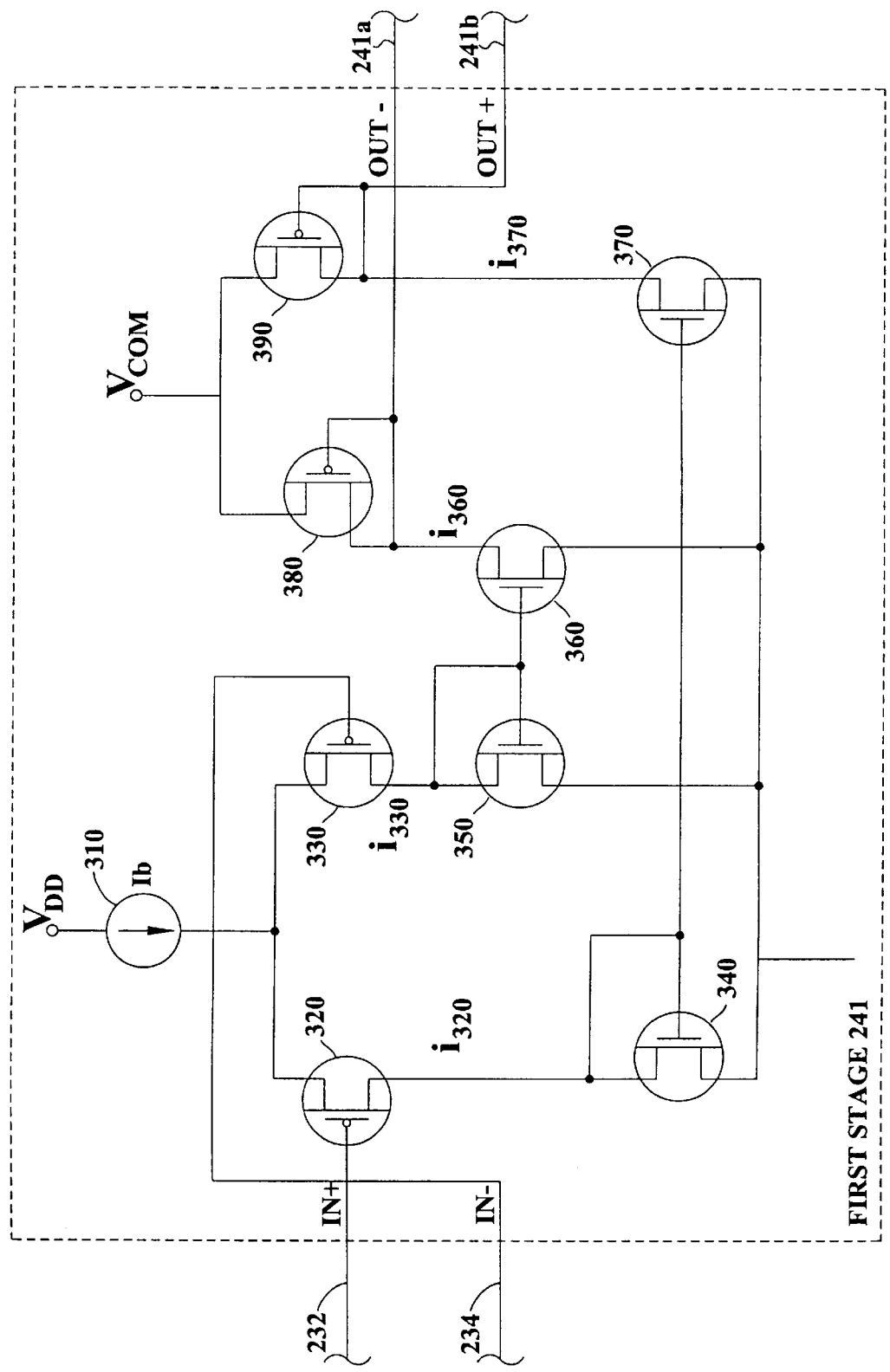
FIG. 10 shows the first stage of the pre-amplifier of this invention in greater detail.

FIG. 10 shows the first stage 241 in greater detail. The circuit shown in FIG. 10 is a folded, differential common source amplifier. It should be appreciated that, although the input and output signal lines to which the second stage 243 and the third stage 245 are connected is different than in the first stage 241, the structure of the second stage 243 and the third stage 245 are identical to that shown in FIG. 10.

In particular, as shown in FIG. 10, the signal line 232 is connected through the IN+ terminal of the first stage 241 to the gate of a first PMOS transistor 320. The other signal line 234 is connected to the IN– terminal to the gate of a second PMOS transistor 330. The sources of the first and second PMOS transistors 320 and 330 are connected to a common current source 310. The common current source 310 outputs a current $I_b$.

The drain of the first PMOS transistor 320 is connected to both the gate and the drain of a first NMOS transistor 340. Similarly, the drain of the second PMOS transistor 330 is connected both the gate and the drain of a second NMOS transistor 350. The gate of the second NMOS transistor 350 is also connected to the gate of a third NMOS transistor 360, while the gate of the first NMOS transistor 340 is also connected to the gate of a fourth NMOS transistor 370. The drain of the fourth NMOS transistor 370 is connected to the signal line 241b through the OUT+ terminal of the first stage 241. The drain of the third NMOS transistor 360 is similarly connected to the output signal line 241a through the OUT– terminal of the first stage 241. The sources of the first-fourth NMOS transistors 340–370 are connected to ground.

The drain of the third NMOS transistor 360 is also connected to a gate and a drain of a third PMOS transistor 380. Similarly, the drain of the fourth NMOS transistor 370 is also connected to a gate and a drain of a fourth PMOS transistor 390. The sources of the third PMOS transistor 380 and the fourth PMOS transistor 390 are connected to a common voltage $V_{COM}$.

Thus, the first and second PMOS transistors 320 and 330 form a differential common source amplifier. The first-fourth NMOS transistors 340–370 form a current mirror. The third and fourth PMOS transistors 380 and 390 form a load having the same transistor type as the differential common source amplifier formed by the PMOS transistors 320 and 330.

Figure 11:
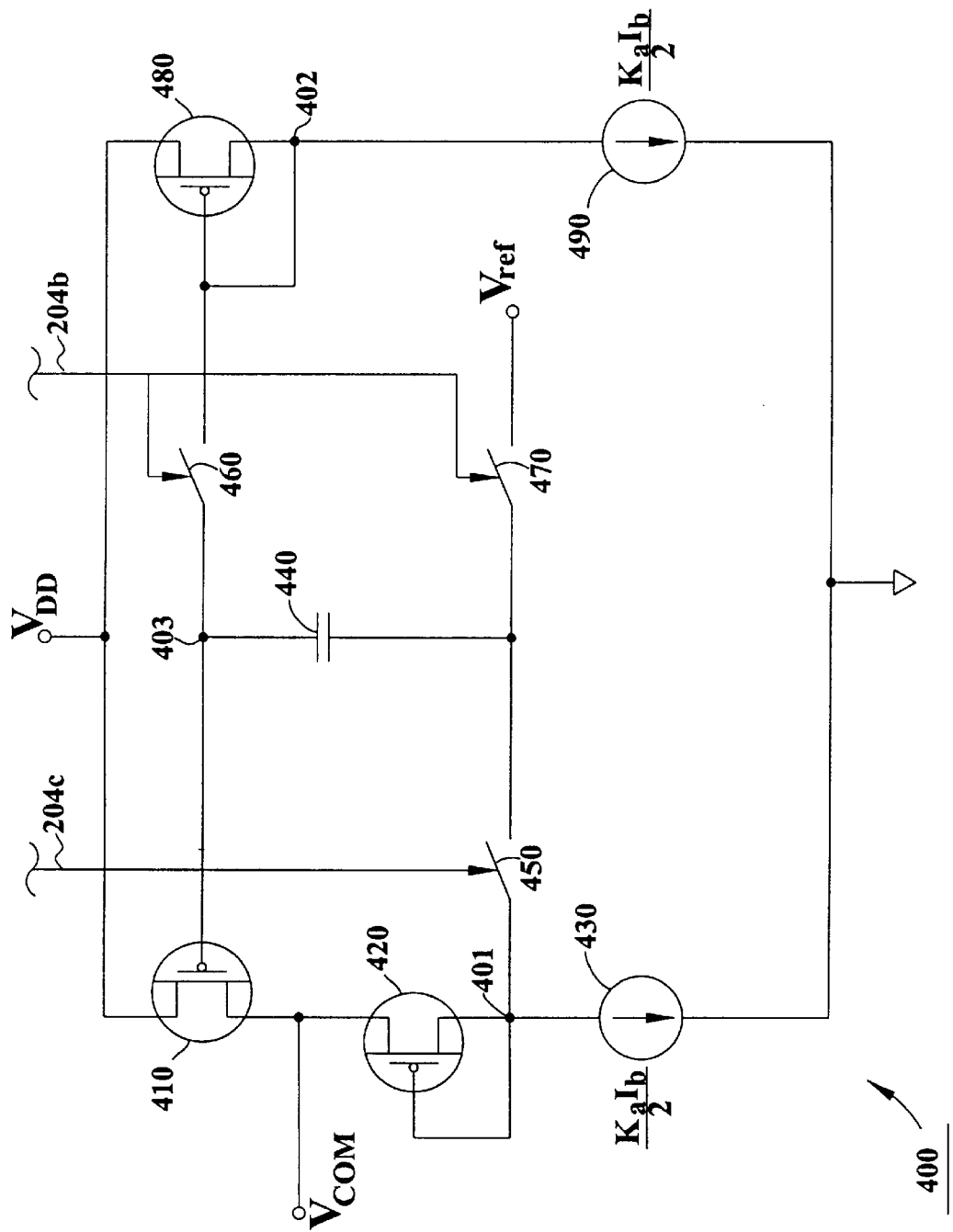
FIG. 11 shows the common mode control circuit of the pre-amplifier of this invention in greater detail.

FIG. 11 shows a common voltage supply circuit 400 of the pre-amplifier 240 for generating the common voltage $V_{COM}$. As shown in FIG. 11, the supply voltage $V_{DD}$ is connected to the sources of a fifth PMOS transistor 410 and a sixth PMOS transistor 480. The gates of the fifth and sixth PMOS transistors 410 and 480 are connected together through a first switch 460. In particular, the gate of the fifth PMOS transistor 410 is connected to a first pole of the first switch 460 and is also connected to the first plate of a capacitor 440. The gate of the sixth PMOS transistor 480 is connected to the second pole of the first switch 460 and to its drain. The drain of the fifth PMOS transistor 410 is connected to the source of a seventh PMOS transistor 420 and to the sources of the third and fourth PMOS transistors 380 and 390. Thus, the voltage $V_{COM}$ is provided by the drain of the fifth PMOS transistor 410.

The gate and drain of the seventh PMOS transistor 420 are connected together and to one pole of a second switch 450. The gate and drain of the fifth NMOS transistor 420 are also connected to one end of a second current source 430. The gate and drain of the sixth PMOS transistor 480 are also connected to one input of a third current source 490. The other terminals of the second and third current sources 430 and 490 are connected to ground.

Each of the second and third current sources 430 and 490 output a current of $kI_b/2$. The constant k is chosen to ensure proper bias currents are supplied to the third and fourth PMOS transistors 380 and 390. In an alternative embodiment, each of the stages 241, 243 and 245 has its own common voltage generating circuit 400. In either case, the constant k is chosen based on the number of stages to be driven by each common voltage generating circuit 400. In general, k should be twice the number of stages to be driven. In particular:

$$k=(2*n)+1$$

where n is the number of stages to be driven by the common voltage generating circuit.

The second pole of the second switch 450 is connected to the second plate of the capacitor 440 and the first pole of a third switch 470. The second pole of the third switch 470 is connected to the reference voltage $V_{ref}$. The second switch 450 is controlled by a control signal output by the control/timing circuit 200 on a control line 204c. The first and third switches 460 and 470 are controlled by a control signal output by the control/timing circuit 200 on a control line 204b.

The first and second PMOS transistors 320 and 330 forming the input of the first stage 241 are a classic PMOS differential pair. The output currents $I_{320}$ and $I_{330}$ of the transistors 320 and 330 are mirrored by the first-fourth NMOS transistors 340–370. Thus, the current of the differential input stage formed by the transistors 320 and 330 is:

$$I_{330} - I_{320} = g_{320} * (V_{IN+} - V_{IN-})$$

where $g_{320}$ is the transconductance of both the first PMOS transistor 320 and the second PMOS transistor 330.

As described above, because the first and second PMOS transistors 320 and 330 are both P-type transistors, their transconductance is generally the same. This is because, although the transconductance is very dependent upon uncontrollable manufacturing process variables, the transistors 320 and 330 are both PMOS transistors, and therefore were formed during the same manufacturing process steps. In particular, the uncontrollable manufacturing processes which affect the transconductance parameter $K'_P$ of the PMOS transistors 320 and 330, while uncontrollable, will be the same for both transistors.

That is, because the PMOS transistors 320 and 330 undergo the same manufacturing process steps, the transconductance parameter $K'_P$ of each of the PMOS transistors 320 and 330 are affected to the same degree. Thus, the transconductance parameters of the PMOS transistors 320 and 330 are closely matched, and their transconductances g are generally the same. For the same reasons, the transconductances g of the first and second NMOS transistors 340 and 350 are generally the same. Likewise, the transconductances g of the third and fourth NMOS transistors 360 and 370 are generally the same. Finally, for the same reasons, the transconductances g of the third and fourth PMOS transistors 380 and 390 are generally the same.

In addition, the transconductances of the first-fourth NMOS transistors 340–370 of the current mirror are ratioed to increase the gain of the circuit. In particular, the transconductances of the third and fourth NMOS transistors 360 and 370 are multiples of the transconductances of the second and first NMOS transistors 350 and 340, respectively. Preferably, the same multiple is used for the transistors 360 and 370. Thus:

$i_{360} = k * i_{330}$, and
$i_{370} = k * i_{320}$

The output PMOS transistors 380 and 390 of the load section are diode connected, so that the differential output is:

$$V_{OUT+} - V_{OUT-} = (i_{360} - i_{370})/g_{380}$$

where $g_{380}$ is the transconductance of the third PMOS transistor 380 and the fourth PMOS transistor 390. Accordingly, the voltage gain $A_V$ of the first stage 241 is:

$$A_V = (V_{OUT+} - V_{OUT-})/(V_{IN+} - V_{IN-})$$
$$= k * (g_{320}/g_{380})$$

Furthermore, the transconductance g of a PMOS transistor having a width w and length l and biased at a current I is:

$$g = (2 * K'_P * I * (w/l))^{1/2}$$

where $K'_P$ is the manufacturing process-dependent transconductance parameter for the PMOS transistors 320, 330, 380 and 390.

Finally, the bias currents in the first stage 241 for the first and second PMOS transistors 320 and 330 are $I_b/2$, while the bias current in the first stage 241 for the third and fourth PMOS transistors 380 and 390 are $k * I_b/2$. Thus, the gain Av for the first stage 241 is:

$$A_V = k * [(2 * K'_P * I_b (w_{320}/l_{320}))/(2 * K'_P * k * (I_b/2) * (w_{380}/l_{380}))]^{1/2}$$
$$= [(2 * k * (w_{320}/l_{320}))/(w_{380}/l_{380})]^{1/2}$$

Thus, the gain $A_V$ of the first stage 241 is independent of the transconductance parameter $K'_P$, which is highly dependent upon the uncontrollable variable manufacturing process parameters which occur during manufacturing of the PMOS transistors 320, 330, 380 and 390. It should be appreciated that each of the first, second and third stages 241, 243 and 245 are generally identical. It should also be appreciated that, the first and second PMOS transistors 320 and 330 can be formed of multiple transistors that can be switched in and out of the circuit forming the first stage to create various gain settings.

In the common mode bias circuit shown in FIG. 11, the fifth and sixth PMOS transistors 420 and 480 are biased at the same bias current as the transistors 380 and 390 of the first stage 241 shown in FIG. 10. Furthermore, the seventh PMOS transistor 420 matches the third and fourth PMOS transistors 380 and 390, so that at the bias condition ($V_{IN+} - V_{IN-} = 0$):

$$V_{COM} - V_{401} = V_{COM} - V_{OUT+}$$
$$= V_{COM} - V_{OUT-}$$

The control signals input on the signal lines 204c and 204b are non-overlapping signals such that when the signal on signal line 204a is high, the signal on signal line 204b is high. Thus, at the beginning of each cycle, the signal on signal line 204b is high. The capacitor 440 is charged to $V_{402} - V_{ref}$. Since the sixth PMOS transistor 480 is designed to have a large w/l ratio, $V_{402}$ will be a few millivolts above the threshold voltage. Furthermore, when the signal line 204b is high, the signal line 204a is high and thus the input lines 232 and 234 of the first stage are switched to $V_{ref}$. The voltage $V_{403}$ will be at the bias voltage on the sixth PMOS transistor 480. The bias voltage on the sixth PMOS transistor 480 is approximately the correct voltage to ensure that the correct bias current is supplied to the load portion.

Next, when the switches 460 and 470 are open and the switch 450 is closed, the fifth PMOS transistor 410 acts as a high gain voltage amplifier with a current source load, to control the voltage $V_{COM}$. Assuming the fifth PMOS transistor 410 is properly sized, such that it supplies the desired bias current to the seventh PMOS transistor 420 and thus to all the output PMOS transistors 380 and 390 of the first, second and third stages 241, 243 and 245, the fifth PMOS transistor 410 will supply the necessary current at the same gate voltage as the sixth PMOS transistor 480. That is, when the switches 460 and 470 are opened, and the switch 450 is closed, a negative feedback loop is formed. The negative feedback loop includes the capacitor 440, the fifth PMOS transistor 410, the seventh PMOS transistor 420 and the switch 450. Thus, the output of the fifth PMOS transistor 410 is adjusted, whenever the voltage $V_{401}$ departs from the voltage $V_{ref}$, appropriately to return the voltage $V_{401}$ to be equal to the voltage $V_{ref}$. Accordingly, $V_{COM}$ is the voltage output by the fifth PMOS transistor 410 that causes the voltage $V_{401}$ to be equal to the voltage $V_{ref}$. Therefore, $V_{403} = V_{402}$
$V_{401} = V_{ref}$ Transistor mismatches may affect the circuit shown in FIG. 11, such that the fifth PMOS transistor 410 cannot supply enough current to maintain the desired voltage. Therefore, the transconductance $g_{410}$ is large. Since the fifth and sixth PMOS transistors 410 and 480 have large w/l ratios, $V_{403}$ and $V_{402}$ will still be very close to each other, and just above the threshold voltage. Thus, this will only affect $V_{401}$ by a few tens of millivolts.

Figure 12:
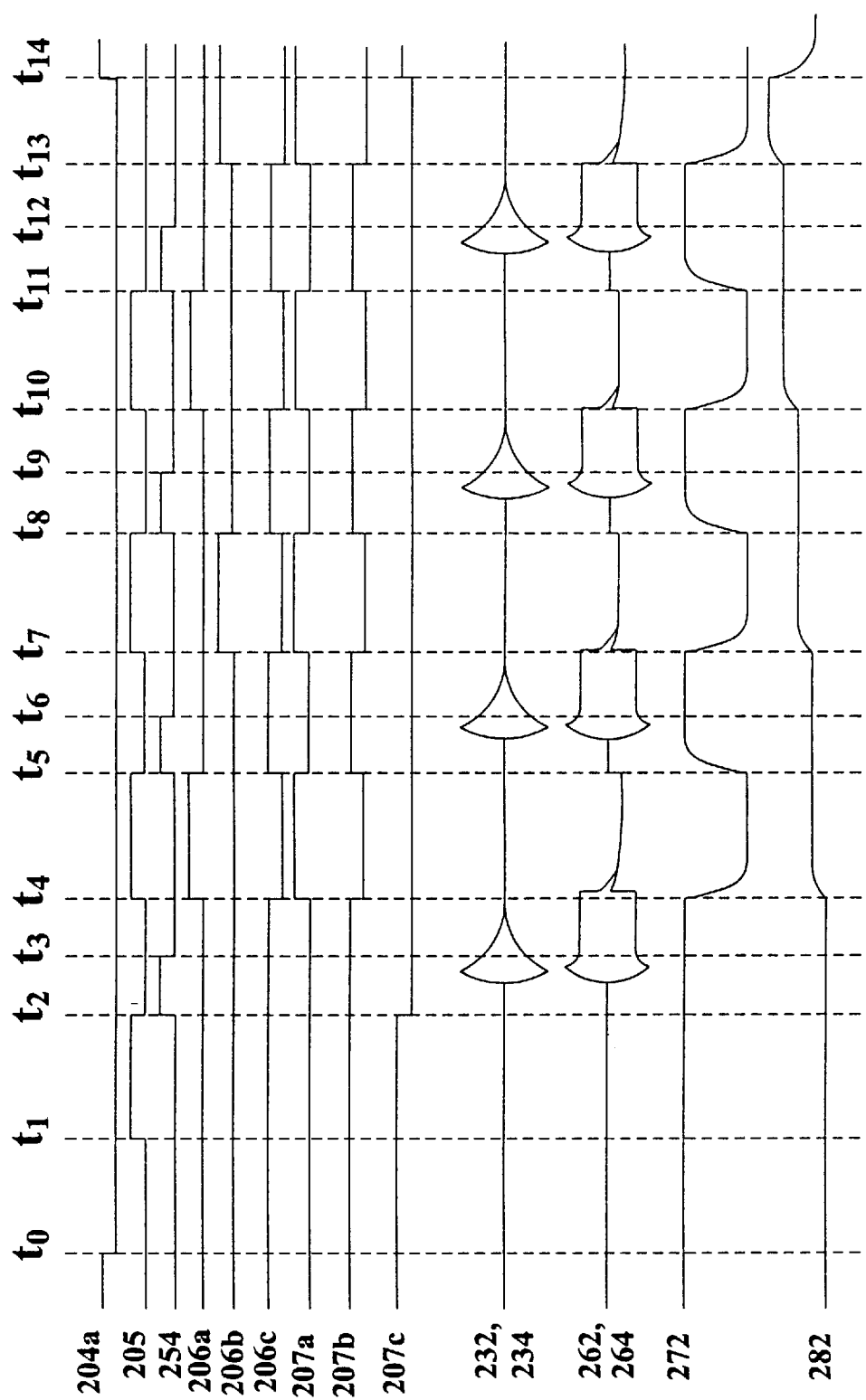
FIG. 12 is a timing diagram showing the signals of the various elements of the electronic measurement system of this invention at different times.

FIG. 12 is a timing diagram showing the various input and output signals on various ones of the control and signal lines shown in FIGS. 7–11. In particular, as shown in FIG. 12, at time to, the signal on the signal line 204a goes low, opening the switches 246a–246f and disconnecting the input terminals IN+ and IN– of the first, second and third stages 241, 243 and 245 from the reference voltage $V_{ref}$. Next, at time $t_1$, the signal on the signal line 205 goes high, closing the switches 247a–247f. At the same time, the signal on the signal line 207c goes low, opening the switch 286. This ends the resetting process for the operational amplifier 285 and allows it to begin integrating for the next measurement cycle.

Next, at time $t_2$, the signal on the signal line 205 goes low while the signal on the signal line 254 simultaneously goes high. Accordingly, a signal appearing on the signal lines 232 and 234 from the input multiplexer 230 are amplified by the pre-amplifier 240, forming the signals on the signal lines 242 and 244.

Then, at time $t_3$, the signal on the signal line 254 goes low, opening the switches 265 and 266 to sample and hold the signals appearing on the signal lines 242 and 244 to form the signals shown in FIG. 12 on the signal lines 262 and 264.

Next, at time $t_4$, the signal on the signal line 205 again goes high to reset the first, second and third stages 241, 243 and 245 of the pre-amplifier 240. At the same time, the signals on the signal lines 206a and 207a go high while the signals on the signal lines 206c and 207b go low. The signals on the signal lines 206b and 207c remain low. Thus, the switches 271a and 271b are closed, the switches 273a and 273b are open, the switches 275a and 275b are closed, switch 283 is closed, switch 284 opens and switch 286 remains open. Accordingly, a falling edge appears on the output signal line 272 from the operational amplifier 274 and a positive voltage step is stored by the integrator 280 and appears on the output line 282.

Next, at time $t_5$, the signals on the signal lines 205, 206a and 207a go low while the signals on the signal lines 254, 206c and 207b go high. This causes the output of the operational amplifier 274 to return to its to level, thus resetting the demodulator for another measurement cycle. Then, at time $t_6$, the signal on the signal line 254 again goes low to again sample the amplified output signals output from the transducer 130 through the pre-amplifier 240. Next, at time $t_7$, the signals on the signal lines 205, 206b and 207a go high while the signals on the signal lines 206c and 207b go low and the signal on the signal line 206a and 207c remain low. Thus, at time $t_7$, the switches 271a, 271b and 286 remain open, the switches 273a and 273b close and the switches 275a and 275b open. At the same time, the switch 283 again closes and the switch 284 again opens. A falling edge again occurs on the signal output on the signal line 272 from the operational amplifier 274 and another step is stored by the integrator 280 and output on the signal line 282.

The operation at times $t_8$–$t_{10}$ replicates the operations at times $t_2$–$t_4$. Similarly, the operations at times $t_{11}$–$t_{13}$ replicate the operations at times $t_5$–$t_7$. Thus, the operations at times $t_8$–$t_{13}$ will not be further discussed, other than to say that the integrator 280 at times $t_{10}$ and $t_{13}$ again stores an additional step and outputs it on the signal line 282. Thus, at time $t_{13}$, the output of the integrator 280 on the signal line 282 is four unit steps high. Then, at time $t_{14}$, which occurs after the A/D converter 290 has converted the signal on the signal line 282 to a digital signal and has output it on the signal line 292 to the controller 110, the signals on the signal lines 204a and 207c go high, resetting the pre-amplifier 240 and the integrator 280. Thus, the electronic measurement system 100 is ready for the next measurement cycle.

While this invention has been described in conjunction with specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing form the spirit and scope of the invention as defined in the following claims.

What is claimed is:

1. An amplifier circuit for amplifying a pair of electric signals and having a process-independent gain, comprising:
   a differential common-source amplifier portion to which the pair of electric signals are input, the differential common-source amplifier portion comprising input transistors having a doping type;
   a load portion outputting a pair of amplified electric signals, the load portion comprising a pair of diode-connected transistors that are the same doping type as the input transistors;
   a current mirror portion connected between the differential, common-source amplifier portion and the load portion; and
   a common voltage supply portion connected to the load portion;
   wherein the process-independent gain of the amplifier circuit is independent of process variables of a process used to form the amplifier circuit.

2. The amplifier circuit of claim 1, wherein the differential, common-source amplifier portion and the load portion have transistors having a first doping type, and the current mirror has transistors having a second doping type.

3. The amplifier circuit of claim 2, wherein the common voltage supply portion also has transistors having the first doping type.

4. The amplifier circuit of claim 2, wherein the differential, common-source amplifier portion and the load portion each comprise PMOS transistors, and the current mirror comprises NMOS transistors.

5. The amplifier circuit of claim 4, wherein the common voltage supply portion comprises PMOS transistors.

6. The amplifier circuit of claim 1, wherein the differential common source amplifier portion comprises:
   a first P-type transistor, a first one of the pair of electric signals connected to a gate of the first P-type transistor;
   a second P-type transistor, a second one of the pair of electric signals connected to a gate of the second P-type transistor; and
   a current source connected to a source of each of the first and second P-type transistors;
   wherein a drain of each of the first and second P-type transistors is connected to the current mirror portion.

7. An amplifier circuit for amplifying a pair of electric signals and having a process-independent gain, comprising:
   a differential common-source amplifier portion to which the pair of electric signals are input, comprising:

a first P-type transistor, a first one of the pair of electric signals connected to a gate of the first P-type transistor, a second P-type transistor, a second one of the pair of electric signals connected to a gate of the second P-type transistor, and a current source connected to a source of each of the first and second P-type transistors;

a load portion outputting a pair of amplified electric signals;

a current mirror portion connected between the differential, common-source amplifier portion and the load portion, comprising:

a first N-type transistor, a gate and a drain of the first N-type transistor connected to the drain of the first P-type transistor and a source of the first N-type transistor connected to ground, a second N-type transistor, a gate and a drain of the second N-type transistor connected to the drain of the second P-type transistor and a source of the second N-type transistor connected to ground, a third N-type transistor, a gate of the third N-type transistor connected to the gate of the second N-type transistor and a source of the third N-type transistor connected to ground, and a fourth N-type transistor, a gate of the fourth N-type transistor connected to the gate of the first N-type transistor and a source of the fourth N-type transistor connected to ground; and a common voltage supply portion connected to the load portion;

wherein:

the process-independent gain of the amplifier circuit is independent of process variables of a process used to form the amplifier circuit, a drain of each of the first and second P-type transistors is connected to the current mirror portion, and a drain of each of the third and fourth N-type transistors are connected to the load portion.

8. The amplifier circuit of claim 7, wherein the load portion comprises:

a third P-type transistor, a gate and a drain of the third P-type transistor connected to the source of the third N-type transistor and outputting a first one of the pair of amplified electric circuits; and a fourth P-type transistor, a gate and a drain of the fourth P-type transistor connected to the source of the fourth N-type transistor and outputting a second one of the pair of amplified electric signals;

wherein a source of each of the third and fourth P-type transistors is connected to the common voltage supply portion.

9. The amplifier circuit of claim 8, wherein the common voltage supply circuit comprises:

a fifth P-type transistor, a source of the fifth P-type transistor connected to a voltage source and a drain of the fifth P-type transistor connected to the sources of the third and fourth P-type transistors;

a sixth P-type transistor, a source of the sixth P-type transistor connected to the drain of the fifth P-type transistor;

a second current source connected between ground and a gate and a drain of the sixth P-type transistor;

a first controllable switch, a first pole of the first controllable switch connected to a gate of the fifth P-type transistor;

a second controllable switch, a first pole of the second controllable switch connected to the gate and the drain of the sixth P-type transistor;

a capacitor connected between the gate of the fifth P-type transistor and a second pole of the second controllable switch;

a third controllable switch connected between a reference voltage and the second pole of the second controllable switch;

a seventh P-type transistor, a source of the seventh P-type transistor connected to the voltage source, a gate and a drain of the seventh P-type transistor connected to a second pole of the first controllable switch; and a third current source connected between ground and the gate and drain of the seventh P-type transistor;

wherein the first and third controllable switches are commonly controlled.

10. An amplifier circuit for amplifying a pair of electric signals and having a process-independent gain, comprising:

a differential common-source amplifier portion to which the pair of electric signals are input;

a load portion outputting a pair of amplified electric signals;

a current mirror portion connected between the differential, common-source amplifier portion and the load portion; and a common voltage supply portion connected to the load portion, wherein:

the process-independent gain of the amplifier circuit is independent of process variables of a process used to form the amplifier circuit, and the pair of electric signals are generated by a transducer circuit and the pair of amplified signals are input to a sample and hold circuit.

11. The amplifier circuit of claim 10, wherein the transducer circuit comprises an electronic position encoder.

12. The amplifier circuit of claim 11, wherein the transducer circuit further comprises a multiplexer connected between the electronic position encoder and the differential common source amplifier portion.

13. An amplifier circuit for amplifying a pair of electric signals, the amplifier circuit comprising a plurality of serially connected amplifier stages, the pair of electric signals connected to and input as a pair of signals by a first one of the plurality of stages, a pair of amplified output signals output by each stage input by each downstream stage of the plurality of stages as the pair of signals, a last stage of the plurality of stages outputting a pair of amplified output signals as the pair of amplified electric signals to a next circuit element, wherein each stage comprises:

a differential, common-source amplifier portion to which the pair of signals are input;

a load portion outputting the pair of amplified output signals; and a current mirror portion connected between the differential, common-source amplifier portion and the load portion;

wherein a gain of each stage is independent of process variables of a process used to form the amplifier circuit.

14. The amplifier circuit of claim 13, further comprising a common voltage supply circuit connected to each of the plurality of stages.

15. The amplifier circuit of claim 14, wherein the common voltage supply circuit comprises:

a first P-type transistor, a source of the first P-type transistor connected to a voltage source and a drain of the first P-type transistor connected to the load portion;

a second P-type transistor, a source of the second P-type transistor connected to the drain of the first P-type transistor;

a first current source connected between ground and a gate and a drain of the second P-type transistor;

a first controllable switch, a first pole of the first controllable switch connected to a gate of the first P-type transistor;

a second controllable switch, a first pole of the second controllable switch connected to the gate and the drain of the second P-type transistor;

a capacitor connected between the gate of the first P-type transistor and a second pole of the second controllable switch;

a third controllable switch connected between a reference voltage and the second pole of the second controllable switch;

a third P-type transistor, a source of the third P-type transistor connected to the voltage source, a gate and a drain of the third P-type transistor connected to a second pole of the first controllable switch; and a second current source connected between ground and the gate and drain of the third P-type transistor;

wherein the first and third controllable switches are commonly controlled.

16. The amplifier circuit of claim 13, wherein each stage further comprises a separate common voltage supply circuit.

17. The amplifier circuit of claim 16, wherein the separate common voltage supply circuit of each stage comprises:

a first P-type transistor, a source of the first P-type transistor connected to a voltage source and a drain of the first P-type transistor connected to the load portion;

a second P-type transistor, a source of the second P-type transistor connected to the drain of the first P-type transistor;

a first current source connected between ground and a gate and a drain of the second P-type transistor;

a first controllable switch, a first pole of the first controllable switch connected to a gate of the first P-type transistor;

a second controllable switch, a first pole of the second controllable switch connected to the gate and the drain of the second P-type transistor;

a capacitor connected between the gate of the first P-type transistor and a second pole of the second controllable switch;

a third controllable switch connected between a reference voltage and the second pole of the second controllable switch;

a third P-type transistor, a source of the third P-type transistor connected to the voltage source, a gate and a drain of the third P-type transistor connected to a second pole of the first controllable switch; and a second current source connected between ground and the gate and drain of the third P-type transistor;

wherein the first and third controllable switches are commonly controlled.

18. The amplifier circuit of claim 13, wherein the differential, common-source amplifier portion of each stage comprises:

a first P-type transistor, a first one of the pair of signals connected to a gate of the first P-type transistor;

a second P-type transistor, a second one of the pair of electric signals connected to a gate of the second P-type transistor; and a current source connected to a source of each of the first and second P-type transistors;

wherein a drain of each of the first and second P-type transistors is connected to the current mirror portion.

19. The amplifier circuit of claim 18, wherein the current mirror portion of each stage comprises:

a first N-type transistor, a gate and a source of the first N-type transistor connected to the drain of the first P-type transistor and a drain of the first N-type transistor connected to ground;

a second N-type transistor, a gate and a source of the second N-type transistor connected to the drain of the second P-type transistor and a drain of the second N-type transistor connected to ground;

a third N-type transistor, a gate of the third N-type transistor connected to the gate of the second N-type transistor and a drain of the third N-type transistor connected to ground; and a fourth N-type transistor, a gate of the fourth N-type transistor connected to the gate of the first N-type transistor and a drain of the fourth N-type transistor connected to ground;

wherein a source of each of the third and fourth N-type transistors are connected to the load portion.

20. The amplifier circuit of claim 19, wherein the load portion of each stage comprises:

a third P-type transistor, a gate and a drain of the third P-type transistor connected to the source of the third N-type transistor and outputting a first one of the pair of amplified electric circuits; and a fourth P-type transistor, a gate and a drain of the fourth P-type transistor connected to the source of the fourth N-type transistor and outputting a second one of the pair of amplified electric signals;

wherein a source of each of the third and fourth P-type transistors is connected to a common voltage supply portion.

21. The amplifier circuit of claim 13, wherein, for each stage, the differential, common-source amplifier portion and the load portion have transistors having a first doping type, and the current mirror has transistors having a second doping type.

22. The amplifier circuit of claim 13, wherein, for each stage, the differential, common-source amplifier portion and the load portion each comprise PMOS transistors, and the current mirror comprises NMOS transistors.

23. The amplifier circuit of claim 13, wherein the pair of electric signals input to the first stage are generated by a transducer circuit and the pair of amplified electric signals output by the last stage are input to a sample and hold circuit.

24. The amplifier circuit of claim 23, wherein the transducer circuit comprises an electronic position encoder.

25. The amplifier circuit of claim 24, wherein the transducer circuit further comprises a multiplexer connected between the electronic position encoder and the differential common source amplifier portion of the first stage.

26. The amplifier circuit of claim 13, further comprising, for each stage:

a first switch connected between a reference voltage and a first one of the pair of input signals;

a second switch connected between the reference voltage and a second one of the pair of input signals;

a third switch connected between a first one of the pair of amplified output signals and the first one of the pair of input signals; and a fourth switch connected between a second one of the pair of amplified output signals and the second one of the pair of input signals;

wherein the first and second switches are commonly controlled and the third and fourth switches are commonly controlled.

27. The amplifier circuit of claim 26, further comprising, between each stage and an adjacent downstream stage, a pair of capacitors, each capacitor of the pair of capacitors connected in series with one output terminal of the stage and a corresponding input terminal of the adjacent downstream stage, each capacitor of the pair of capacitors connected upstream of a connection point of the corresponding one of the third and fourth switches.

28. The amplifier circuit of claim 13, wherein, in each stage:

the differential common-source amplifier portion comprises input transistors having a doping type; and the load portion comprises a pair of diode-connected transistors that are the same doping type as the input transistors.

* * * * *